(12) United States Patent
Garcia et al.

(10) Patent No.: US 9,595,358 B2
(45) Date of Patent: Mar. 14, 2017

(54) LONG-TERM STORAGE DEVICE INCLUDING A VENTILATED STORAGE CASE INTENDED TO HOUSE A CONTAINMENT CASE CONTAINING RADIOACTIVE MATERIALS

(75) Inventors: Justo Garcia, Courbevoie (FR); Pascal Prud'homme, Paris (FR); Dai Yokoe, Tokyo (JP)

(73) Assignee: TN INTERNATIONAL, Montigny le Bretonneux (FR)

( * ) Notice: Subject to any disclaimer, the term of this patent is extended or adjusted under 35 U.S.C. 154(b) by 529 days.

(21) Appl. No.: 13/990,476

(22) PCT Filed: Dec. 20, 2011

(86) PCT No.: PCT/EP2011/073331
§ 371 (c)(1),
(2), (4) Date: May 30, 2013

(87) PCT Pub. No.: WO2012/084891
PCT Pub. Date: Jun. 28, 2012

(65) Prior Publication Data
US 2013/0261367 A1  Oct. 3, 2013

(30) Foreign Application Priority Data
Dec. 21, 2010  (FR) .................................... 10 60952

(51) Int. Cl.
*G21C 19/06* (2006.01)
*G21F 5/00* (2006.01)
(Continued)

(52) U.S. Cl.
CPC ............. *G21F 9/008* (2013.01); *G21C 19/06* (2013.01); *G21F 5/005* (2013.01); *G21F 5/008* (2013.01); *G21F 5/10* (2013.01)

(58) Field of Classification Search
USPC .......... 250/505.1, 506.1, 507.1, 515.1, 518.1
See application file for complete search history.

(56) References Cited

U.S. PATENT DOCUMENTS

| 4,780,269 A | 10/1988 | Fischer et al. |
| 2006/0188054 A1 | 8/2006 | Pennington |
| 2010/0254785 A1* | 10/2010 | Grubb .................... G21C 19/07 414/146 |

FOREIGN PATENT DOCUMENTS

| EP | 0019544 A1 | 11/1980 |
| EP | 1359594 A2 | 11/2003 |

(Continued)

OTHER PUBLICATIONS

International Search Report for PCT/EP2011/073331 dated May 10, 2012.

*Primary Examiner* — Nicole Ippolito
(74) *Attorney, Agent, or Firm* — Pearne & Gordon LLP

(57) ABSTRACT

The invention relates to a long-term storage device (1) intended to receive a containment case (3) containing radioactive materials, where this device includes a main body (2) having an inner surface delimiting a housing (7).

According to the invention, in an unloaded configuration, in which the containment case containing radioactive materials is absent from the storage device, the latter includes a storage case (9) delimiting a cavity (4) to receive the containment case, where the storage device also includes ventilation means allowing air to circulate between the exterior of the storage device and a space delimited between the inner surface of the main body and the storage case (9).

12 Claims, 7 Drawing Sheets

(51) Int. Cl.
*G21F 5/12* (2006.01)
*G21F 9/00* (2006.01)
*G21F 5/005* (2006.01)
*G21F 5/008* (2006.01)
*G21F 5/10* (2006.01)

(56) References Cited

FOREIGN PATENT DOCUMENTS

| FR | 2918649 A1 | 1/2009 | |
|---|---|---|---|
| JP | 2000-162378 A | 6/2000 | |
| JP | 2002-257991 A | 9/2002 | |
| JP | 2008-101994 A | 5/2008 | |
| WO | 0004558 A1 | 1/2000 | |
| WO | 2008/030987 A2 | 3/2008 | |
| WO | WO 2009/007367 * | 1/2009 | ............. G21C 19/07 |

* cited by examiner

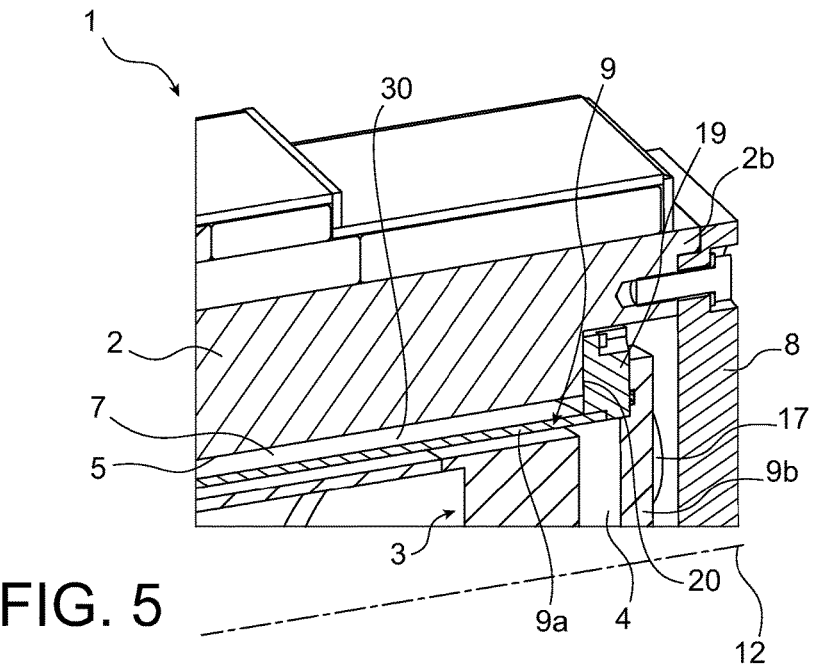
FIG. 5
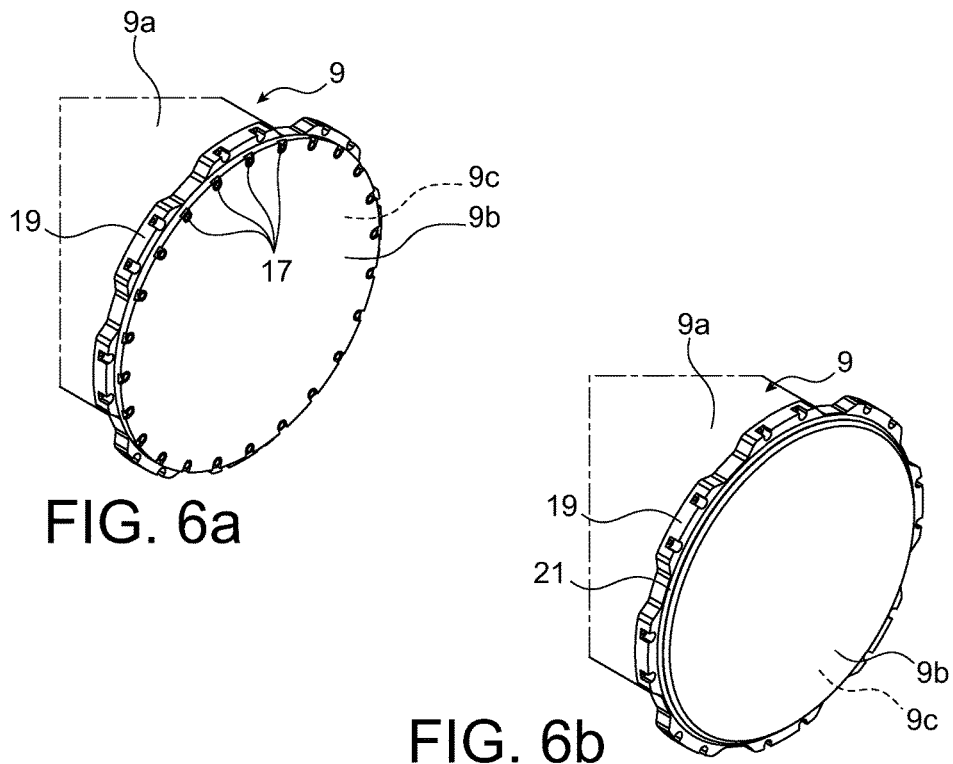
FIG. 6a
FIG. 6b

LONG-TERM STORAGE DEVICE INCLUDING A VENTILATED STORAGE CASE INTENDED TO HOUSE A CONTAINMENT CASE CONTAINING RADIOACTIVE MATERIALS

TECHNICAL FIELD

The present invention relates, in general terms, to a long-term storage device intended to receive a containment case containing radioactive materials, such as irradiated nuclear fuel assemblies, nuclear waste, etc.

The invention also relates to a long-term storage site for radioactive materials, including multiple long-term storage devices.

It also relates to a method for transferring a containment case containing radioactive materials, from a transfer package to a long-term storage device.

STATE OF THE PRIOR ART

When a nuclear fuel assembly has been irradiated following its use in a nuclear power station, it can be placed in a sealed container called a containment case, before being stored over a period of twenty to sixty years, for example in a storage site, also called a long-term repository.

To transport the case to the storage site, the case is firstly placed in a package called a transport package or transfer package, in order to form an assembly called a package.

The package is then transported to the storage site in which a method is used to transfer it from the packaging case to a ventilated reception cavity within the storage device. This device can take the form of a long-term storage package, or again a concrete module such as the one known from document U.S. Pat. No. 4,780,269. This latter case is of interest, in that it provides a horizontal reception housing, facilitating the method of transferring the containment case. Indeed, habitually, the transfer package containing the containment case is aligned with the reception housing of the concrete module, both being positioned horizontally, and then to pull or push on this case in order to transfer it from its package housing to the associated reception cavity. This transfer technique is also known from document U.S. Pat. No. 4,780,269.

In the other case of transfer to a long-term storage package, the loading of the case in the reception cavity can be accomplished in the manner described in document FR 2 918 649, namely also horizontally, before the loaded package is tipped up into its long-term storage vertical position.

The case can also be transferred vertically; this technique is known, for example, from document EP 1 359 594.

Whichever solution is chosen, during its long-term storage in its cavity the containment case containing the radioactive materials is subject to stress corrosion cracking. This risk, which is naturally increased when the containment case is exposed to an atmosphere containing marine salt, relates in particular to the portions of the case located close to welds, since these cause the strong internal stresses in the case.

Given that the propagation of such cracks can lead to a breach of containment of the radioactive materials, it is then necessary to take measures to restrict/prohibit the development of any corrosion in the case.

A known solution consists in providing a storage case in which the containment case containing the radioactive materials is housed in sealed fashion. It enables the storage case to constitute a defence against corrosion of the containment case, since if stress corrosion cracking develops, it will firstly relate to this protective case.

Such a storage case can, alternatively or simultaneously, be designed to provide double containment of the radioactive materials, in combination therefore with the containment case. This solution is, for example, known from document WO 00/04558.

Whatever the function of the storage case, in operation the loading of the containment case in this storage case, together with the loading of the radioactive materials in the containment case, are undertaken on the site of the nuclear reactor, and the two case covers are then attached on to their respective case bodies, one after the other.

This double-case assembly is then subjected to the same steps as those mentioned above, namely transport followed by transfer to a long-term, ventilated storage device.

However, this solution makes the transport costly, since the presence of an additional case increases the overall mass of the transported assembly, or alternatively reduces the transportable payload of radioactive materials. In addition, in the case of stress corrosion cracking of the storage case, or any other damage requiring an intervention, the entire double-case assembly must be returned to the site of the nuclear reactor in order to undergo the required intervention. Once this has been completed the double-case assembly is once again transported to the long-term storage site, to be installed in its associated device. The increase in the number of these transport operations, combined with their high costs, make the method particularly costly.

In addition, the transport/transfer packages may have to undergo substantial modifications to receive such an assembly, which is differentiated from the simple containment cases which transport/transfer packages habitually house.

Lastly, the presence of the storage case constitutes a barrier to dissipation of the heat released by the radioactive materials during the transport operation. This results in a risk of an unacceptable rise in temperature within the containment case.

DESCRIPTION OF THE INVENTION

The main purpose of the invention is therefore to provide a long-term storage device the design of which enables the disadvantages mentioned above to be at least partially remedied, compared with the embodiments of the prior art.

To accomplish this, one object of the invention is a long-term storage device intended to receive a containment case containing radioactive materials, where the said device includes a main body having an inner surface delimiting a housing. According to the invention, in an unloaded configuration, in which the said containment case containing radioactive materials is absent from the storage device, the latter includes a storage case housed in the said housing of the body, and delimiting a cavity to receive the containment case, where the said storage device also includes ventilation means allowing air to circulate between the exterior of the storage device and a space delimited between the said inner surface of the main body and the storage case.

The invention is therefore differentiated from the prior art by the fact that the storage case forms an integral part of the long-term storage device, and is therefore no longer associated with the containment case containing the radioactive materials during their transport. This generates substantial operating gains, since this storage case is no longer intended to be transported between the site of the nuclear reactor and the long-term storage site. In the same way, in the event of stress corrosion cracking of this ventilated case in the storage device, or in the event of any other deterioration requiring intervention, the containment case can be extracted from its cavity and then rehoused within a storage device located nearby, in a new storage case. For its part the defective storage case can be extracted and then either repaired or changed, which does not imply any transport to the site of the nuclear reactor, neither of the containment case nor of the storage case.

The invention is also advantageous in the sense that it allows use of conventional transport/transfer packages to transport the containment cases between the site of the nuclear reactor and the long-term storage site.

Also, since the containment case containing the radioactive materials is no longer transported with the storage case, the heat released by the radioactive materials is dissipated better, and the risk of an unacceptable rise in temperature within the containment case is greatly reduced.

By way of example, it is noted that the ventilation means, the aim of which is to collect and to dissipate a proportion of the heat released by the radioactive materials contained in the containment case, can be produced in any manner known to those skilled in the art.

In the package's loaded configuration the storage case is preferably dedicated to forming a protective case against corrosion of the containment case, and/or a second containment of the radioactive materials. More generally, in the package's loaded configuration the containment case is intended to be housed in sealed fashion in the reception cavity of the storage case.

The storage device preferably includes means to prevent the storage case sliding relative to the main body, in a direction in which the storage case is introduced into and/or extracted from the said housing.

These means preferably at least prevent the storage case from sliding relative to the main body, in the extraction direction of this case.

These means preferably allow sliding to be prevented in one and/or the other of the abovementioned directions, when the case is open to the exterior, i.e. with its cover removed. In other words, these blocking means allow the storage case to be blocked during extraction and/or introduction of the containment case, when the other covers of the storage device are also removed.

By this means, no undesired movement of the storage case occurs when the containment case is introduced into/extracted from the cavity. These means to prevent sliding can however be made inoperative, for example by unbolting when they include bolts, in particular with the aim of removing the storage case when it must be repaired or replaced. Furthermore, depending on the design of the storage device, these means can also be made inoperative during the long-term storage, and therefore be kept only in the unloaded configuration, and during operations to introduce and extract the containment case.

The storage device is preferably designed such that the storage case can be inserted into/extracted from the housing by sliding. This design simplifies the installation and handling operations.

The storage case is preferably made of metal.

The storage case preferably includes a cover which, when removed, defines a case opening through which the said containment case can be inserted/extracted.

The storage device preferably includes a cover installed on the main body and closing the said housing.

In a loaded configuration in which the said containment case containing radioactive materials is housed in the cavity of the storage case, an inert gas, which is preferably pressurised, is preferably present in the cavity around the containment case. This enables the anti-corrosion function of the containment case to be improved. This gas is preferably helium. Alternatively, the inert gas may be replaced by purified air.

As mentioned above, the main body is a portion of a storage package or a concrete module. In the first case the containment case generally adopts a vertical long-term storage position, whereas in the second case the position is, on the contrary, habitually horizontal.

Whichever case is envisaged, there is preferably a main body at least 200 mm thick around the reception housing of the storage case. In the first long-term storage package case this package does not require, unlike transport/storage packages, that the statutory safety requirements for the transport of nuclear materials on public highways are met, notably the tests known as free drop tests on an undeformable target, which are particularly restrictive. Conversely, the design of a storage package must habitually enable it to preserve the integrity of the containment case following an aircraft crash, followed by a fire, or again in the event of a seism, according to the national laws in force.

The invention also relates to a long-term storage site for radioactive materials, where the said site includes multiple long-term storage devices such as the one described above.

Finally, one object of the invention is a method for transferring a containment case containing radioactive materials from a transfer package to a long-term storage device such as the one described above, including a step intended to introduce the said containment case containing radioactive materials into the said cavity of the storage case, which is itself housed in the said housing of the main body, followed by a step consisting in closing, in sealed fashion, the said storage case.

Other advantages and characteristics of the invention will appear in the non-restrictive detailed disclosure below.

BRIEF DESCRIPTION OF THE DRAWINGS

This description will be made with reference to the attached illustrations, among which:

FIG. 5 represents a partial section view of a lower portion of the loaded package shown in FIGS. 3 and 4;

FIGS. 6a and 6b represent the storage case fitted to the package shown in FIGS. 3 to 5, according to two separate designs;

DETAILED DESCRIPTION OF PREFERRED EMBODIMENTS

Figure 1:
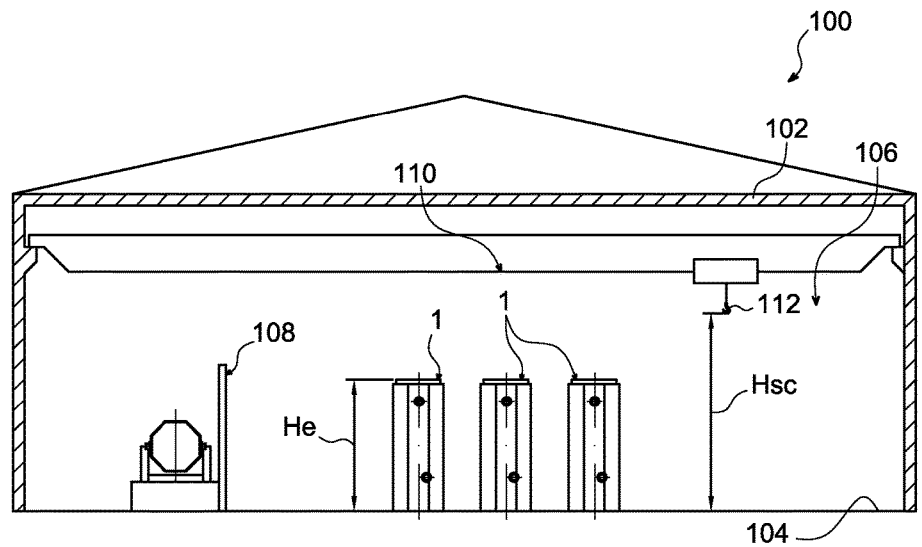
FIG. 1 represents a side view of a long-term storage site for radioactive materials, according to a preferred embodiment of the present invention.
Figure 2:
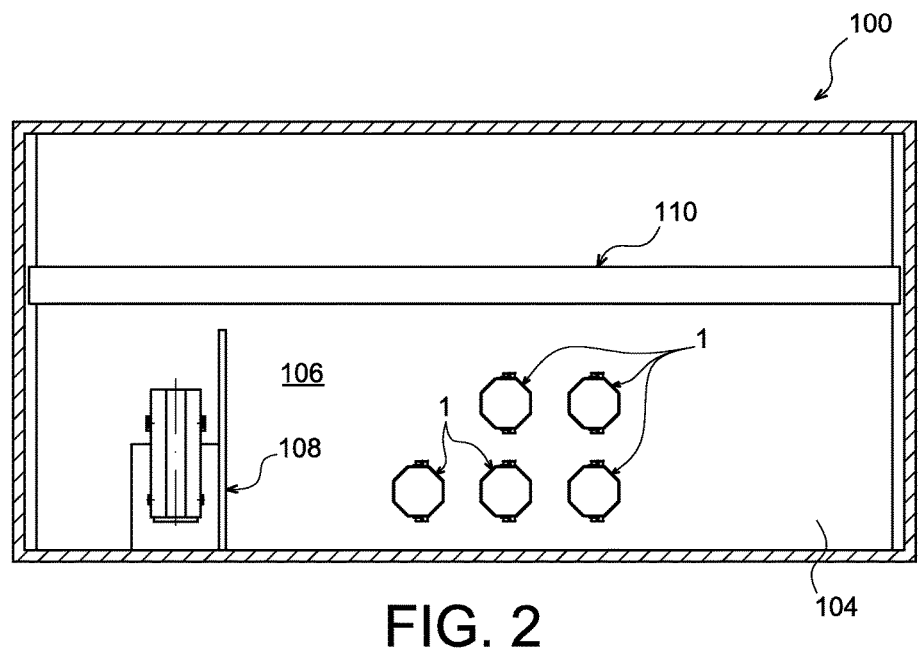
FIG. 2 represents a top view of the site shown in FIG. 1.

With reference firstly to FIGS. 1 and 2, a long-term storage site 100 for radioactive materials can be seen, according to a preferred embodiment of the present invention. Site 100 is closed at the top by a ceiling 102, which makes it take the form of a "warehouse", in which the radioactive materials are intended to be stored for a long period of approximately twenty to sixty years.

Warehouse 100 has a floor 104 on which multiple long-term storage packages 1, which are also objects of the present invention, and which shall be described in detail below, rest vertically. With the loaded configuration, each generally houses a containment case containing radioactive materials such as irradiated nuclear fuel assemblies, where the package and the case are stored in a vertical position.

This way of storing packages 1 vertically enables the spatial requirement of storage space 106 located between floor 104 and ceiling 102 to be optimised greatly, and therefore enables the number of packages 1 able to be stored simultaneously in this space 106 to be maximised. Preferably, and by way of example, packages 1 are stored in parallel rows.

Furthermore, warehouse 100 is fitted with a frame 108 for pivoting the packages, enabling each of the storage packages to be pivoted from the horizontal position to the vertical position during the operation to transfer the associated case, as will be described in detail below.

In addition, warehouse 100 includes a bridge crane for raising/handling the packages, referenced 110, in particular enabling packages 1 to be moved within storage space 106, whilst holding them in a vertical position.

With reference to FIGS. 3 to 7, one of the packages of storage 1, loaded with containment case 3 containing the radioactive materials (not represented), will be described.

Figure 3:
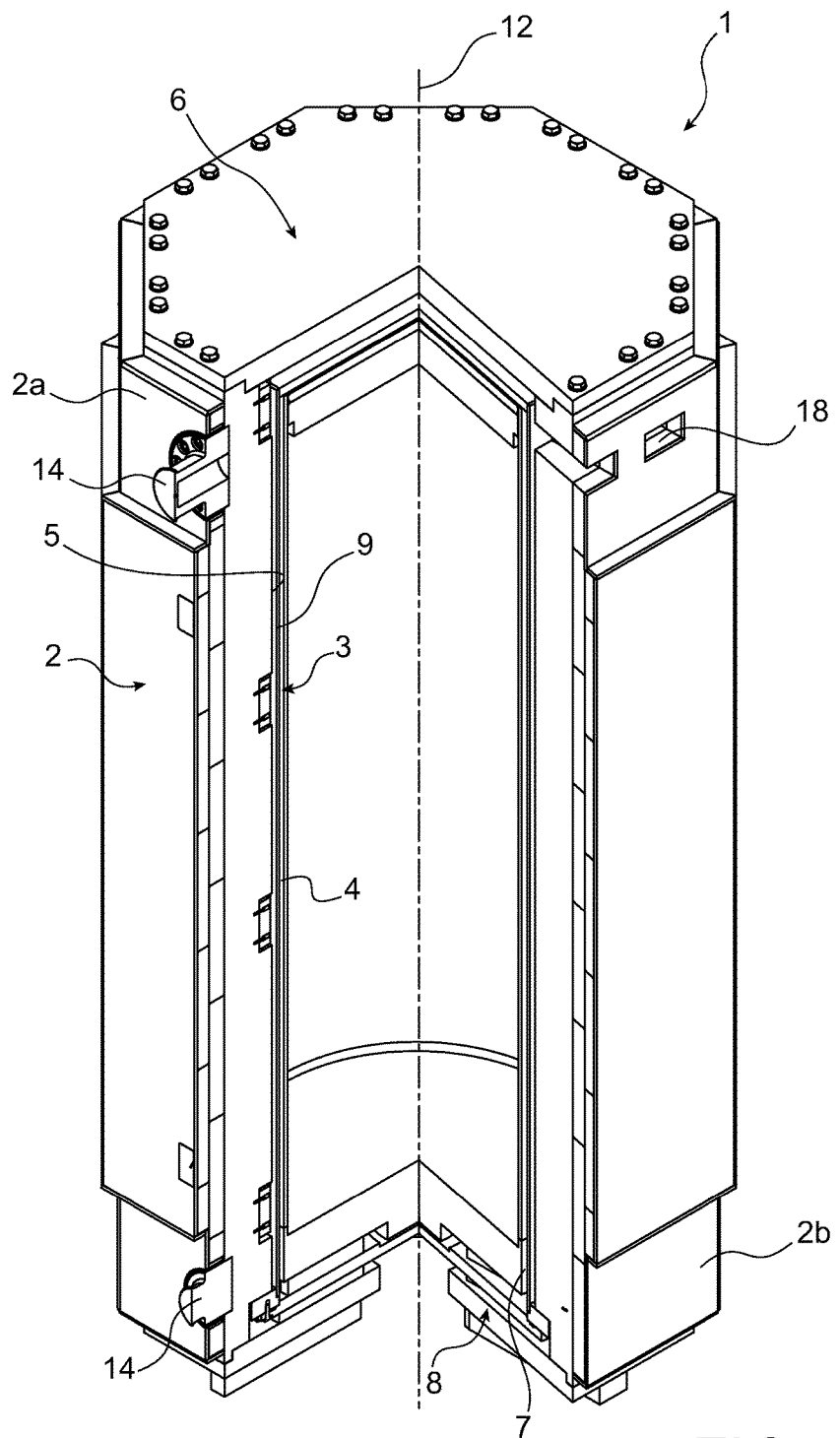
FIG. 3 represents a perspective view showing a long-term storage device according to a first preferred embodiment of the present invention, where the device takes the form of a long-term storage package loaded with a radioactive material containment case.
Figure 4:
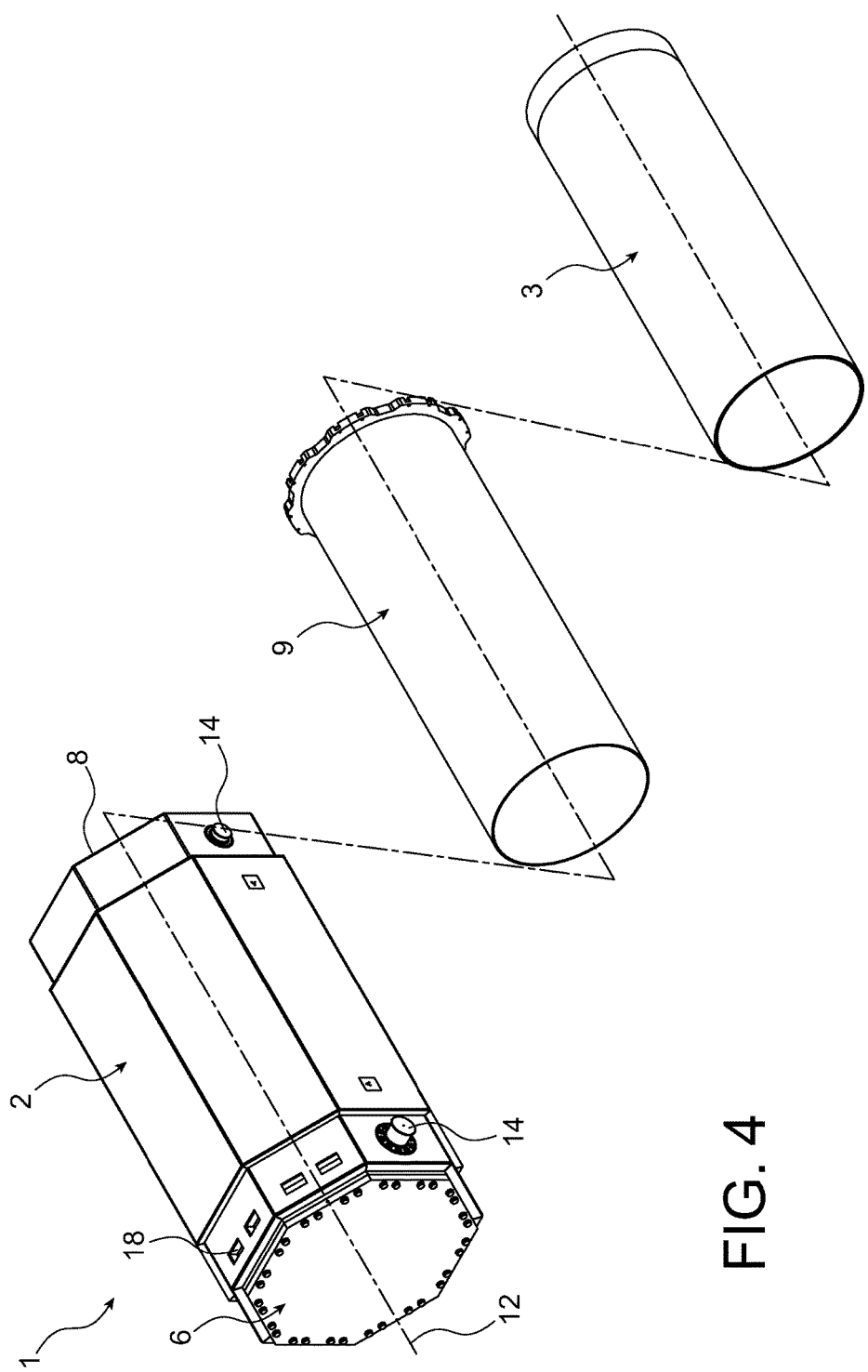
FIG. 4 represents an exploded perspective view of the package shown in FIG. 3.

Firstly, more specifically with reference to FIGS. 3 and 4, package 1, of lengthways axis 12, includes a hollow lateral main body 2 of cylindrical shape, having an inner lateral surface 5 defining a housing 7, which is also roughly cylindrical in shape. Housing 7 receives a storage case 9 providing protection against corrosion of containment case 3, which it receives in a sealed fashion in a cavity 4 which this case 9 delimits internally. Case 9 also provides, in combination with case 3, double containment of the radioactive materials.

Package 1 also includes a detachable head cover 6 closing housing 7 at one upper end 2a of body 2, together with a detachable package base 8 also closing housing 7 at the other end of lateral body 2, called lower end 2b. Package base 8 therefore takes the form of a detachable base cover, which is consequently assembled reversibly on lateral body 2, for example by bolting or equivalent, as is represented diagrammatically in FIG. 5. As will be described in detail below, in the course of a case transfer method this allows the base to be introduced through lower end 2b of package body 2.

As is shown in FIGS. 6a and 6b, case 9 is produced using a cylindrical lateral body 9a of circular section, incorporating a base (not visible) which is generally added on in secure fashion by welding on to the lateral body, where the latter defines at the opposite end an opening 9c sealed by a detachable case cover 9b. Cover 9b is attached securely and reversibly on case body 9a, for example by bolts 17 or by welding 21, so as to provide the desired seal in cavity 4. In the loaded configuration this seal is used, in particular, to put a pressurised inert gas in cavity 4 around containment case 3. This enables the anticorrosion aspect to be improved. The created seal also assists in producing a second containment of the radioactive materials already contained in case 3.

The inert gas is preferably helium, pressurised at a pressure of between 1.1 and 2 bars. During the long-term storage the gas pressure can be controlled so as to detect a possible seal leakage of the storage case, for example produced by one or more stress corrosion cracks. After a seal leakage is detected in this manner an intervention is then carried out on the storage case, as will be described in due course. By way of example, it is noted that the purpose of monitoring of the pressure in cavity 4 is not only to detect a seal leakage of case 9, but also to detect a seal leakage of containment case 3, which is generally at low pressure in this cavity 4.

Storage case 9 and containment case 3 are both made of metal, for example stainless steel.

Furthermore, package 1 provides the habitual functions of neutron shielding, gamma ray protection and mechanical resistance. To achieve this, the thickness of hollow lateral body 2 can notably be designed to be at least 200 mm, and it can be made of steel. Use of concrete to produce the lateral body can also be envisaged.

Package 1 also includes multiple handling devices 14, also called lifting trunnions, intended to co-operate with a spreader (not represented) suspended from hook 112 of lifting platform 110 to enable the package to be moved. There are preferably four or more such devices, distributed near the upper and lower ends of lateral body 2, from which they project radially towards the outside.

In addition, package 1 includes ventilation means allowing air to circulate by natural or forced convection between the exterior of the storage device and an annular space 30 of housing 7, referenced in FIG. 5, which is delimited between inner surface 5 of main body 2 and storage case 9 which protects against corrosion.

These specific means, providing an air flow which enables a proportion of the heat released by the radioactive materials contained in case 3 to be collected and dissipated, can be produced by any means known to those skilled in the art. By way of example, with reference more particularly to FIGS. 5 to 7, it can be seen that lower cover 8 of the package, installed by bolts on lower end 2b of the lateral body, has through-passages 17 enabling the exterior of package 1 to be linked with housing 7. There are comparable through-passages 18 in upper end 2a of the lateral body, under upper cover 6, also with the aim of causing housing 7 to be linked with the exterior.

In addition, at its opening 9c, case body 9a has a flange ring 19 supported against a shoulder 20 of lateral body 2. Bolts 22 enable flange ring 19 to be pressed against shoulder 20, where all elements 22, 19 and 20 consequently constitute means to prevent storage case 9 sliding relative to main body 2, in a direction of introduction into/extraction from containment case 3 in/out of cavity 4, equal to the direction of axis 12.

Figure 7:
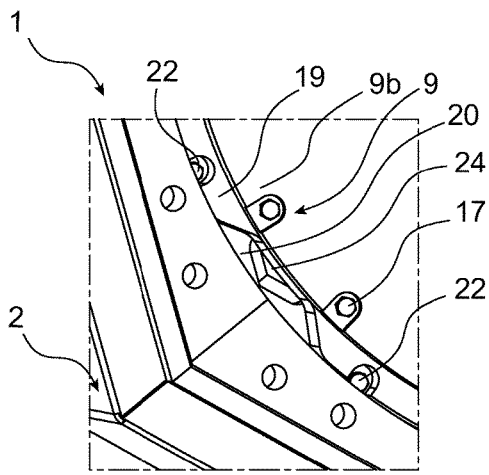
FIG. 7 represents another perspective view of the lower portion of the loaded package shown in FIGS. 3 to 6b.

To allow air to pass through this installation, flange ring 19 and shoulder 20 are jagged, and offset angularly relative to one another to produce free spaces 24 for air to pass through between the teeth, as can best be seen in FIG. 7.

The outside air thus passes through lower cover 8 via through-passages 17, and then traverses free spaces 24 defined by flange ring 19 and shoulder 20. It then enters free annular space 30, between case 9 and inner surface 5 of housing 7.

From this time forth, when the package is in a vertical position the air collects heat released by the radioactive materials contained in case 3, and rises due to its warmth. All along its passage upwards, the air closely following case 9 therefore collects the heat released by the radioactive materials, and then evacuates it when it escapes annular space 30 through through-passages 18 of upper end 2*a*. The air exiting from these passages 18 then joins the external environment of the packaging, and it should also be noted that the phenomenon which has just been explained occurs continuously.

Finally, as can be seen, the inner surface delimiting cavity 4 can be fitted with means enabling case 3 to be assisted in sliding relative to case 9 when it is introduced, and also when it is extracted, and these means take, for example, the form of parallel ramps/rails extending in the direction of lengthways axis 12, which is also the direction in which case 3 slides in case 9. Similar means can be fitted on inner surface 5 delimiting housing 7, to assist case 9 to slide in lateral body 2, when it is introduced and also when it is extracted.

With this regard, the invention also relates to a method for transferring such a containment case 3 containing radioactive materials from a transfer package with a fixed base to cavity 4 of a long-term storage package 1 which has just been described. By way of example, it is noted that the transfer package may be a package designed solely to implement such a transfer of the case within a single nuclear site, for example between the nuclear reactor and the long-term storage site, where this package is not then designed to be taken on the public highway or, more preferentially, it may be a package for transferring radioactive materials which is specially designed to be taken on the public highway, as is known to those skilled in the art.

Figure 8A:
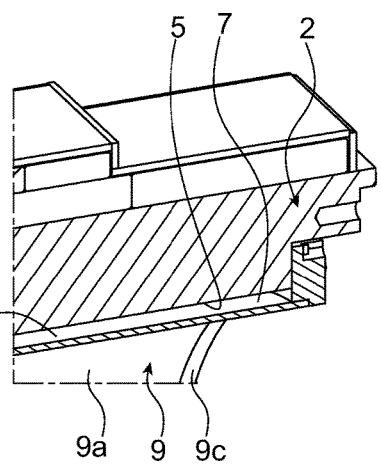
FIGS. 8a to 8c represent views representing diagrammatically different successive steps of a method for transferring a containment case containing radioactive materials, according to a preferred embodiment of the present invention.
Figure 8B:
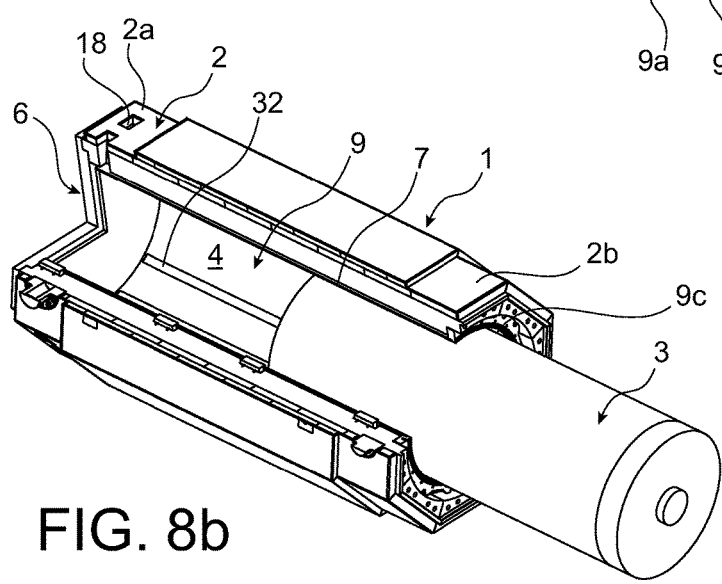
Figure 8C:
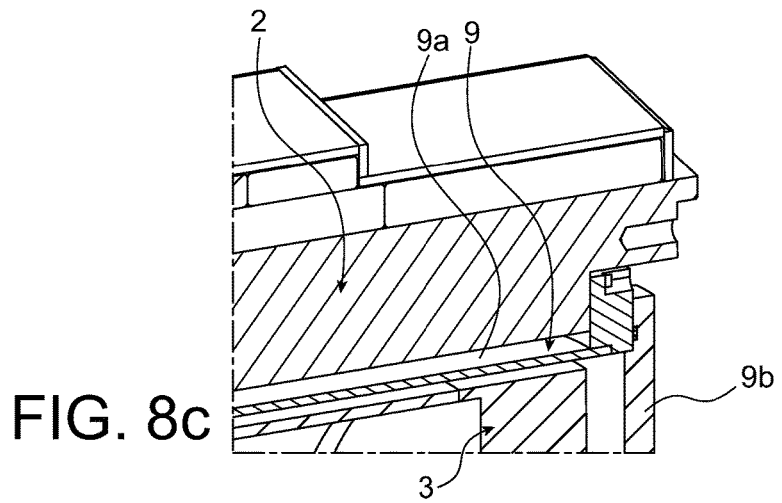

FIGS. 8*a* to 8*c* represent different successive steps of a transfer method according to a preferred embodiment of the present invention.

The method commences with package 1 in the unloaded configuration, i.e. without case 3. It is consequently of identical design to the one shown in the previous figures, without incorporating case 3 containing the radioactive materials. In particular, the assembly formed of bolts 22, flange ring 19 and shoulder 20 prevents case 9 sliding relative to body 2, in the direction of axis 12, which is the same as the directions for extraction/introduction of cases 3 and 9.

Package 1 is firstly placed in a horizontal position, using its trunnions 14 and frame 108, present in warehouse 100 represented in FIGS. 1 and 2.

Lower cover 8 forming the package base is removed, and case cover 9*b* is then extracted, revealing case opening 9*c*, as can be seen in FIG. 8*a*.

A transfer package (not represented) containing case 3 to be transferred is also positioned such that it is facing opening 9*c*, using a transport vehicle on which the transfer package lies horizontally, with the case head aligned in the direction of this opening 9*c*. The two packages are placed facing one another, at a distance from one another, in such a way that their respective lengthways axes are appreciably merged.

The following step consists, after the detachable head cover of the transfer package has been removed, in moving the vehicle such that the transfer package docks with storage package 1.

When contact has been made securing may be accomplished by mechanically connecting the lifting trunnions of both packages, for example using beams having recesses in which the trunnions are housed.

The following step consists in introducing case 3 into cavity 4 of case 9 through opening 9*c*, as has been represented diagrammatically in FIG. 8*b*. To accomplish this, conventional drive mechanisms known to those skilled in the art are operated. This movement then causes case 3 to enter gradually into cavity 4 head-first. In addition, when the movement of case 3 is complete and it is still lying horizontally, the case head is located at upper end 2*a* of the package body, facing detachable head cover 6 which has remained all the time in its position on package 1. By way of example, during the horizontal movement of case 3 its sliding movement within storage case 9 is facilitated by the presence of the abovementioned ramps, on which it rests, referenced 32 in FIG. 8*b*.

After the securing and docking means are disengaged, case 9 is closed in sealed fashion, by reversible attachment of cover 9*b*, by bolts or welding, as is shown in FIG. 8*c*. At this stage the inert gas may be introduced into cavity 4, by conventional means. Lower cover 8 is then installed in its turn on end 2*b* of the lateral body, again using bolts.

Lastly, package 1 is tipped vertically by frame 108, and then lifting bridge directs package 1 loaded with case 3 to its storage position within the storage space, keeping it suspended at all times by its upper trunnions 14, ensuring that it is moved in a vertical position.

Before the package is tipped into its vertical position, bolts 22 can be removed to allow case 9 to slide relative to lateral body 2. This enables these bolts 22 to be prevented from being subjected to the full weight of the loaded double case, during the long period of vertical storage. On the contrary, this double case can then simply rest on detachable base 8 of the package.

The same transfer method can then be repeated for the next storage package, after it has been positioned on pivoting frame 108 in its horizontal position.

During the long-term storage, when a check of the inert gas pressure reveals that the pressure has dropped, this indicates a probable seal leakage of storage case 9, for example produced by one or more stress corrosion cracks. After such a detection, covers 8 and 9*c* can be removed to extract containment case 3, after which it can be rehoused within another storage device 1 positioned nearby, according to the same method as the one described above. This extraction by sliding of case 3 is preferably undertaken in a horizontal position, with bolts 22 raised in order to prevent case 9 sliding relative to main body 2. By preventing case 9 from sliding the extraction of case 3 located within it is facilitated.

Defective storage case 9, for its part, can be extracted from housing 7 by sliding, after unscrewing bolts 22, and can then be repaired or replaced.

Alternatively, the embodiment which has just been described can be implemented in a similar manner by loading and extracting case 3 no longer horizontally, but vertically, placing the transfer package vertically above the storage package.

Figure 9:
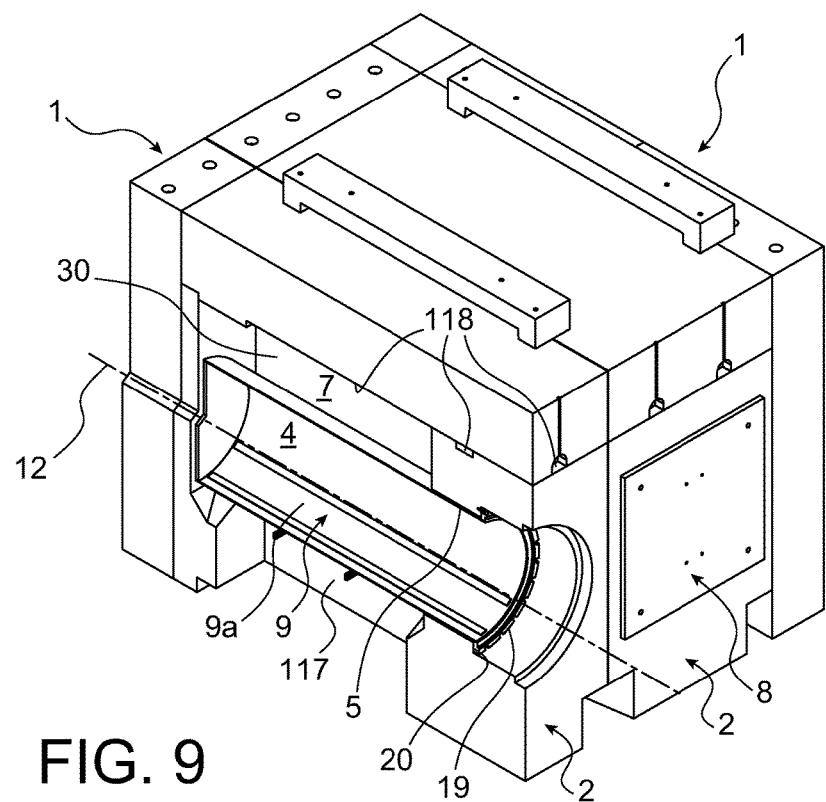
FIG. 9 represents a perspective view showing two long-term storage devices according to a second preferred embodiment of the present invention, where each device includes a concrete module.
Figure 10:
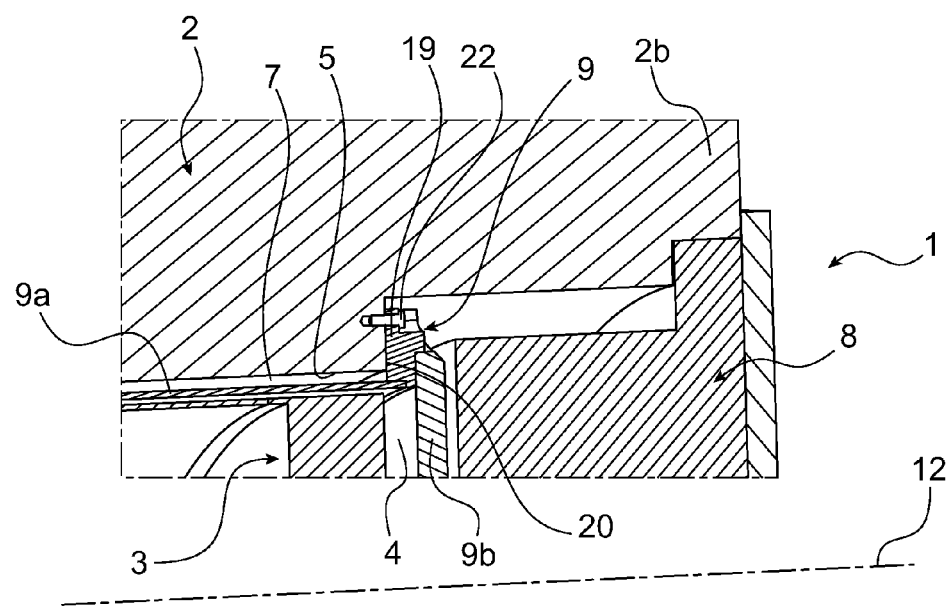
FIG. 10 represents a section view of a front portion of one of the two storage devices shown in the previous figure.

With reference, at present, to FIGS. 9 and 10, a storage device 1 according to a second preferred embodiment will be described. This second embodiment has great similarities with the first preferred embodiment described with reference to the previous figures. Moreover, in the figures, the elements bearing the same numerical references are identical or similar elements.

It can thus be seen that the essential difference from the first embodiment lies in the fact that main body 2 is not a portion of a package, but a concrete module enabling containment case 3 to be stored horizontally.

In addition, the ventilation means enabling the air to circulate have an opening 117 in the lower portion of main body 2, under case 9, enabling the outside air to be exchanged with housing 7. The air then flows upwards in annular space 30, circumferentially around storage case 9, before reaching a network of channels 118 enabling the air to escape upwards, outside long-term storage device 1.

With this design, bolts 22 can remain permanently on flange ring 19 of case 9, in particular during the long-term storage, and are then removed only when this case 9 must be extracted from housing 7 to be repaired or replaced.

Various modifications can naturally be made by those skilled in the art to the invention just described, solely as non-restrictive examples.

The invention claimed is:

1. A long-term storage device (1) intended to receive a containment case (3) containing radioactive materials, where the said device includes a main body (2) having an inner surface (5) delimiting a housing (7),
wherein in an unloaded configuration, in which the said containment case (3) containing radioactive materials is absent from the storage device, the storage device (1) includes a storage case (9) housed in the said housing (7) of the body, and delimiting a cavity (4) to receive the containment case (3), where the said storage device also includes ventilation means (17, 18, 117, 118) allowing air to circulate between the exterior of the storage device and a space (30) delimited between the said inner surface (5) of the main body (2) and the storage case (9).

2. A storage device according to claim 1, further comprising means (22) to prevent the storage case (9) sliding relative to the main body (2), in a direction in which the storage case is introduced into or extracted from the said housing.

3. A storage device according to claim 1, wherein the storage case (9) can be inserted into/extracted from the housing (7) by sliding.

4. A storage device according to claim 1, wherein the storage case (9) is made of metal.

5. A storage device according to claim 1, wherein the storage case (9) includes a cover (9b) which, when it is removed, defines a case opening (9c), through which the said containment case (3) can be inserted/extracted.

6. A storage device according to claim 1, further comprising a cover (8) installed on the main body (2) and closing the said housing (7).

7. A storage device according to claim 1, wherein in a loaded configuration, in which the said containment case (3) containing radioactive materials is housed in sealed fashion in the cavity (4) of the storage case (9), an inert gas is present in the cavity around the containment case.

8. A storage device according to claim 1, wherein the said main body (2) is a portion of a storage package or a concrete module.

9. A long-term storage site (100) for radioactive materials, where the said site includes multiple long-term storage devices (1) according to claim 1.

10. A method for transferring a containment case (3) containing radioactive materials from a transfer package to a long-term storage device (1) according to claim 1, wherein the method includes a step of introducing the said containment case (3) containing radioactive materials into the said cavity (4) of the storage case (9), which is itself housed in the said housing (7) of the main body (2), followed by a step consisting in closing, in sealed fashion, the said storage case (9).

11. A storage device according to claim 1, further comprising an attachment portion (22) configured to prevent sliding of the storage case (9) relative to the main body (2) while permitting sliding of the containment case (3) relative to the main body (2) into and out of the cavity (4).

12. A storage device according to claim 9, wherein the containment case (3) containing radioactive materials is housed in sealed fashion in the cavity (4) of the storage case (9) and an inert gas is present in the cavity around the containment case.

* * * * *